United States Patent [19]
Johnston

[11] 3,744,811
[45] July 10, 1973

[54] COMPACTLY FOLDING SLED

[76] Inventor: Earl W. Johnston, 555 Clement Drive, Glendale, Calif. 91201

[22] Filed: June 8, 1971

[21] Appl. No.: 150,981

[52] U.S. Cl. .............................................. 280/12 K
[51] Int. Cl. .......................................... B62b 13/16
[58] Field of Search .................... 280/12 K, 12 KL, 280/12 R, 16, 36 R; 9/310

[56] References Cited
UNITED STATES PATENTS

| | | |
|---|---|---|
| 3,190,668 | 6/1965 | Husak .............................. 280/12 K |
| 3,572,757 | 3/1971 | Camps ................................ 280/278 |
| 3,003,778 | 10/1961 | Taggart ............................ 280/12 K |
| 2,062,953 | 12/1936 | Wargo .............................. 280/12 K |
| 1,326,148 | 12/1919 | Hudry ................................ 280/278 |

Primary Examiner—Leo Friaglia
Assistant Examiner—Robert R. Song
Attorney—Sellers & Brace

[57] ABSTRACT

A compactly folding sled having a single, broad runner provided with a seat for one rider and selectively lockable in an upright extended position or compactly folded against the runner when not in use.

6 Claims, 3 Drawing Figures

PATENTED JUL 10 1973 3,744,811
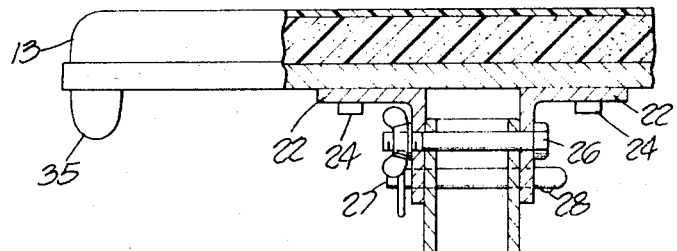
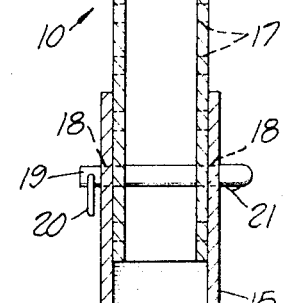
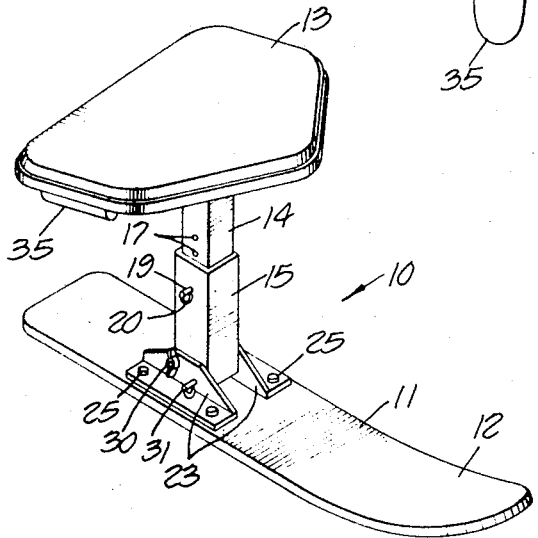
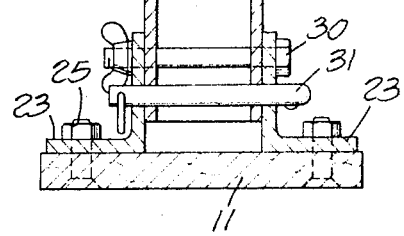
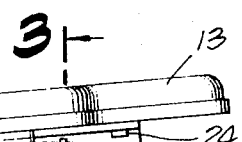
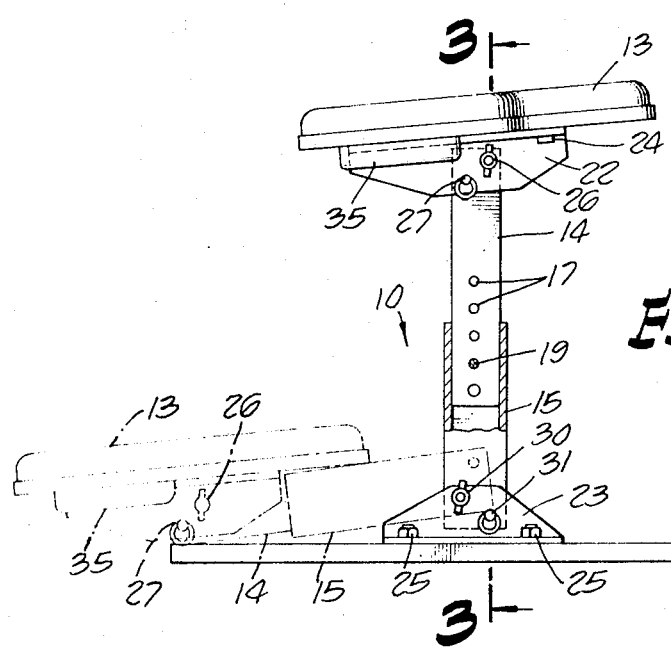
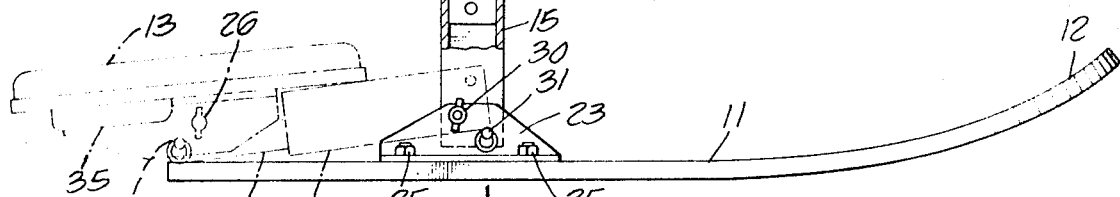
INVENTOR
EARL W. JOHNSTON
BY
ATTORNEYS

COMPACTLY FOLDING SLED

This invention relates to a sled and more particularly to a compactly folding sled designed for use by a single rider.

There is provided by this invention a simple, lightweight, inexpensive but rugged sled employing a single, short but wide runner supporting a folding seat for the rider. The seat strut is readily adjustable in height and is lockable either in a normal upright position or in a second position lying flush against the main body of the runner for shipment and storage. Pairs of pins interconnect the opposite ends of the strut to the runner and to the seat respectively and one of these pins is readily removable thereby permitting the seat to be shifted between its extended and collapsed positions following which the pins are reinsertable and serve to lock the parts in the new position. The single runner is relatively broad and readily supports the rider's weight on even very light fluffy snow and has a thickness which need be no greater than that required to provide requisite rigidity.

Accordingly, it is a primary object of the present invention to provide a simple, rugged, lightweight sled having a single runner and a compactly folding seat.

Another object of the invention is the provision of a sled having a ski-like runner equipped with a seat readily lockable in an upright operating position and in a collapsed position folded against the topside of the runner.

Another object of the invention is the provision of a sled having a single, broad runner to which is captively connected a strut for a seat having provision for collapsing both components flush against the runner.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view of an illustrative embodiment of the invention ready for use;

FIG. 2 is a side elevational view on an enlarged scale showing the seat locked in extended position and including a dot and dash line showing of the seat folded against the runner; and FIG. 3 is a cross sectional view on an enlarged scale taken along line 3—3 on FIG. 2.

Referring initially more particularly to FIG. 1, there is shown a typical embodiment of the invention sled designated generally 10. The main body of the sled comprises a broad, relatively short, thin runner 11 curved upwardly at its forward end 12 and formed of any suitable material including either solid or laminated wood, fiberglass, molded plastic, channel-shaped sheet metal, etc.

A suitable seat 13 for a single rider is movably and foldably secured to runner 11 by rigid strut means preferably comprising a pair of tubular members 14,15 sized to telescope freely lengthwise of one another. Desirably, the strut tubes 14,15 are of non-circular cross-section. Vertical adjustment of the strut is facilitated by the provision of a series of holes 17 in member 14 and at least one set of aligned openings 18 in member 15. These openings accommodate a pin 19 provided at one end with a pull ring 20 and a suitable keeper 21 at its other end. Keeper 21 is of any suitable resilient type normally urged outwardly to the extended position shown in FIG. 3 but readily cammed to its retracted position while the pin is being forcibly inserted or withdrawn from a selected set of aligned openings.

The seat supporting struts 14,15 are here shown as secured to the seat and to the sled runner by pairs of brackets 22,23. Brackets 22 are secured to the underside of the seat by bolts 24 whereas the lower set of brackets 23 are secured to the runner by bolts 25.

The upper end of strut 14 is pivotally secured between the brackets 22 by bolt 26 and is locked rigidly against pivotal movement about this bolt by a suitable locking pin 27 and typically of the same construction as pin 19. Thus the spring keeper 28 at the forward end of pin 27 holds it normally in assembled position but is cammed inwardly when a strong withdrawal force is applied to the opposite end of the pin.

The lower end of strut tube 15 is likewise held permanently assembled between brackets 23 by a bolt 30 and is locked against pivotal movement by a locking pin 31 identical with pin 27.

A feature of locking pins 21,31 is that both are so located relative to the ends of struts 14,15 that they are effective to engage one rim edge of the strut members when the seat is folded to its collapsed position thereby to lock the seat and strut compactly collapsed against runner 11. Thus, in the full line showing of FIG. 2 the seat and its supporting strut are locked immovably in an upright riding position. However, in the folded condition indicated by dot and dash lines, it will be observed that each of the pins 27,31 are positioned to abut a corner of the struts 14,15 so as to prevent extension of the seat. This not only facilitates handling of the sled when not in use but safeguards against unexpected and unintentional unfolding of the parts and the likelihood of injury to the user or nearby articles.

In use, the user withdraws pins 27,31, elevates the seat and then reinserts each of the locking pins. The sled is now ready for use and the rider simply takes a position on the seat with his feet resting against the forward end of the runner and grips handgrips 35 along either lateral edge of the seat while coasting downhill. Guidance of the sled is readily accomplished simply by shifting his weight or using his feet to depress one side of the runner more than the other, or a combination of these maneuvers.

While the particular compactly folding sled herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. A compactly folding sled comprising a single long relatively broad runner having an upturned forward end, a seat for a rider including a single rigid strut means movably connected at one end to said seat and movably connected at the other end thereof to said runner, and means confined to the portion of said strut means closely adjacent the connection thereof to said runner and to said seat for releasably locking said seat and said rigid strut means in the extended operating position thereof and for releasing said seat and strut means for compact folding against said runner, said locking means including a pair of pins at either end of said strut means a first one of each pair of which remains continually assembled transversely of an adjacent end of said strut means and a second one of which is readily removable and then reinsertable transversely of an adjacent end of said strut means at the user's option, the pins of each pair thereof being generally parallel to one another, one pair thereof cooperating when assembled to hold said seat against pivoting relative to said strut means and the other pair thereof cooperating when assembled to hold said runner against pivoting relative to said strut means, and the continually assembled one of each pair of said pins permitting said seat and strut means to fold compactly against said runner when the second pin of each pair thereof is removed from its assembled position.

2. A sled as defined in claim 1 characterized in that said locking means is operable to lock said seat and rigid strut means selectively in the extended and in the collapsed positions thereof.

3. A sled as defined in claim 1 characterized in that said rigid strut means comprises a pair of tubular members sized for telescopic assembly one within the other, and manually operable means for holding said tubular members assembled in different overlapping relationship thereby to adjust the height of said seat when locked in its extended position.

4. A sled as defined in claim 1 characterized in that said strut means is pivotably connected at its ends to said runner and to said seat respectively.

5. A sled as defined in claim 1 characterized in that said second one of each pair of pins includes spring retainer means normally effective to hold said second pins in assembled position but which responds to a deliberately applied force to permit its removal while adjusting said seat between its collapsed and extended positions.

6. A sled as defined in claim 1 characterized in that said strut means comprises tubular stock of non-circular cross-section.

* * * * *